(12) United States Patent
Elnekave et al.

(10) Patent No.: US 10,288,132 B2
(45) Date of Patent: May 14, 2019

(54) ADD-ON BRAKE SYSTEM

(71) Applicant: Israel Aerospace Industries Ltd., Lod (IL)

(72) Inventors: David Elnekave, Mazkeret Batya (IL); Yehuda Markus, Moshav Arugot (IL); Zeev Dvorkin, Mevo Horon (IL); Eran Levy, Ramat Gan (IL); Michael Barkan, Ashdod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 15/221,830

(22) Filed: Jul. 28, 2016

(65) Prior Publication Data

US 2017/0102041 A1    Apr. 13, 2017

(30) Foreign Application Priority Data

Oct. 8, 2015   (IL) .......................................... 241966

(51) Int. Cl.
*F16D 55/225*      (2006.01)
*B64C 25/44*       (2006.01)
(Continued)

(52) U.S. Cl.
CPC ............ *F16D 55/225* (2013.01); *B64C 25/44* (2013.01); *F16D 55/227* (2013.01); *F16D 65/18* (2013.01);
(Continued)

(58) Field of Classification Search
CPC ...... F16D 55/225; F16D 55/227; F16D 65/18; F16D 125/40; F16D 121/24; B64C 25/44
See application file for complete search history.

(56) References Cited

U.S. PATENT DOCUMENTS 2,351,041 A    6/1944  Hawley
6,374,958 B1 *  4/2002  Usui ..................... B60T 13/741
                                                    188/156
(Continued)

FOREIGN PATENT DOCUMENTS

JP         11257381         9/1999

OTHER PUBLICATIONS

Torabzadeh-Tari, Analysis of Electro-Mechanical Actuator Systems in More Electric Aircraft Applications, KTH Electrical Engineering, 126 pages, May 2005.
(Continued)

*Primary Examiner* — Vishal R Sahni
(74) *Attorney, Agent, or Firm* — Dorsey & Whitney LLP (57) ABSTRACT

An add-on brake system includes a housing accommodating a linear actuator including: an electric motor having a rotor and a stator; a nut arrangement coupled to the rotor; a linear threaded plunger associated having a first end linearly protruding from one end of the arrangement and a second end linearly protruding from an opposite end thereof; an inboard brake pad coupled to the housing; and an outboard brake pad associated with the second end, oriented transverse to the plunger. The plunger has an initial unclamped position in which the second end protrudes to an extent $n_1$ from the other end of the arrangement, yielding a spacing $S_1$ between the inboard and outboard brake pads, and a final clamped position in which the second end protrudes to an extent $n_2 > n_1$ from the other end of the arrangement, yielding a spacing $S_2 < S_1$ between the pads.

18 Claims, 6 Drawing Sheets

(51) Int. Cl.
*F16D 65/18* (2006.01)
*F16D 55/227* (2006.01)
*F16D 121/24* (2012.01)
*F16D 125/40* (2012.01)
*F16D 55/00* (2006.01)

(52) U.S. Cl.
CPC .. *F16D 2055/0008* (2013.01); *F16D 2121/24* (2013.01); *F16D 2125/40* (2013.01)

(56) References Cited

U.S. PATENT DOCUMENTS

| | | | |
|---|---|---|---|
| 6,412,610 B1* | 7/2002 | Drennen | F16D 55/227 188/156 |
| 2006/0021831 A1* | 2/2006 | Yamamoto | F16D 65/18 188/72.7 |
| 2014/0000993 A1* | 1/2014 | No | F16D 55/226 188/72.8 |
| 2014/0367209 A1 | 12/2014 | Delayre et al. | |

OTHER PUBLICATIONS

Extended European Search Report for European Application No. 16181487 completed Feb. 21, 2017.

\* cited by examiner

ADD-ON BRAKE SYSTEM

PRIORITY CLAIM

This application claims priority from Israel Patent Application No. 241966 filed on Oct. 8, 2015, which is incorporated herein, in its entirety, by this reference.

TECHNOLOGICAL FIELD

The presently disclosed subject matter relates to brake systems for vehicles, in particular for an air vehicle.

BACKGROUND

It is well known in the field of aviation to provide air vehicles, including aircraft and other airborne vehicles, with a brake system, configured for stopping the air vehicle during its taxiing when on the ground.

Calipers are a common brake arrangement, used also in air vehicle, in which two brake pads are configured for clamping therebetween a portion of the wheel (or an element fixedly associated therewith), thereby preventing it from rotating, effectively stopping the air vehicle.

Hydraulic systems can also be substituted by electromechanical systems which can weigh less and require less maintenance. One example of such a mechanical system is a geared caliper system in which an arrangement of gears associated with an electric motor replacing the hydraulic actuation.

Such electromechanical brake systems can incorporate a powerful motor allowing the brake system to be incorporated in large-scale aircrafts. An example of this is disclosed in US2014/0000993 which relates to an electromechanical brake system includes a base carrier provided with a pair of pad plates for application of pressure to a disc, a caliper housing supported by the base carrier to be movable forward and backward to apply pressure to the pad plates, a pressing member including a ball nut installed at the caliper housing to convert rotational motion into rectilinear motion to apply pressure to the pad plates and a ball screw coupled to the ball nut, a force sensor installed at the ball nut to sense load produced by the ball nut, a motor to produce rotational force to operate the pressing member, and a speed reducer connected to a rotating shaft of the motor to transfer driving force to the pressing member, wherein the speed reducer may be adapted to change a reduction ratio depending on presence of load sensed by the force sensor.

In general, the replacement of hydraulic systems with mechanical/electric systems is performed in other avionic systems other than the brakes. One such example is provided in the research paper "*Analysis of Electro-Mechanical Actuator Systems in More Electric Aircraft Applications*" by Mohsen Torabzadeh-Tari, KTH Electrical Engineering, ISBN 91-7178-0998.

Acknowledgement of the above references herein is not to be inferred as meaning that these are in any way relevant to the patentability of the presently disclosed subject matter.

GENERAL DESCRIPTION

In accordance with a first aspect of the subject matter of the present application, there is provided an add-on brake system for a vehicle, for example an air vehicle, for example an aircraft, is configured for clamping a wheel disc thereof, said add-on brake system comprising:

a housing accommodating a direct-drive linear actuator comprising:
    an electric motor constituted by a rotor and a stator
    a nut arrangement fixedly and directly coupled to the rotor and configured for revolving therewith;
    a linear threaded plunger associated with the nut arrangement for being driven thereby in a linear direction upon the revolution of the latter, said plunger having a first end linearly protruding from one end of the nut arrangement and a second end linearly protruding from an opposite end of the nut arrangement;
at least one inboard brake pad fixedly coupled to the housing;
at least one outboard brake pad associated with the second end of the linear threaded plunger, oriented transverse to the linear threaded plunger and configured for being driven thereby in the linear direction;
said linear threaded plunger being configured for assuming an initial unclamped position in which the second end protrudes to a first extent $n_1$ from the other end of the nut arrangement, yielding a first spacing $S_1$ between the inboard and outboard brake pads, and a final, clamped position in which the second end protrudes to a second extent $n_2 > n_1$ from the other end of the nut arrangement, yielding a second spacing $S_2 < S_1$ between the inboard and outboard brake pads, allowing clamping said wheel disc.

The electric motor can be of a brushless type motor, based on magnetic flux and induction between electromagnets of the stator and permanent magnets of the rotor as known per se.

It is noted that since the inboard brake pad is fixedly associated with the housing, the distance between the housing and the inboard brake pad remains constant throughout the operation of the add-on brake system.

The nut arrangement can have a maximal linear extension H between the first end and second end thereof, and said linear threaded plunger has a maximal linear extension L between its respective ends, so that $L/H < 1.5$, and wherein $n_1, n_2 < H/4$.

The nut arrangement can be a ball-nut type, comprising a plurality of balls constituting the threads of the nut, configured for engaging the matching threads of the linear threaded plunger.

The linear threaded plunger can also comprise a restricting member, configured for preventing the plunger from rotating about its axis, whereby revolution of the nut arrangement about the plunger restricts the displacement of the plunger only to the linear direction.

The restricting member can be associated with the housing in a manner preventing revolution of the plunger. Specifically, the restricting member can be a pin having a first end associated with the plunger and a second end received within a channel formed in the housing and preventing revolution of the pin. The channel can extend in the longitudinal direction, wherein, when said plunger displaces in the linear direction, the pin travels together with the plunger, its second end sliding within the channel of the housing.

In effect, the brake system of the present application provides a compact, light-weight add-on module which can be easily mounted onto the wheel disc of a small-scale air vehicles, for example small-scale aircraft (e.g., drone, light UAV etc.), without significantly increasing the width dimensions of the wheel area throughout its operation.

Since the add-on brake system of the present application is configured for small-scale air vehicles, for example small-scale aircrafts, the amount of power required for arresting the wheeled disc is also considerably lower, the use of the add-on brake system becomes applicable.

Furthermore, the compactness of the add-on brake system according to at least one example of the presently disclosed subject matter can allow for mounting two or more such brake system onto a single wheel of an air vehicle, for example an aircraft, thereby providing a modular assembly based on power requirements concerning braking.

It is also to be noted that the add-on system according to at least one example of the presently disclosed subject matter can be provided on other types of vehicles, and not just air vehicles, wherein such vehicles have at least one wheel that includes a wheel disc.

It is also appreciated that using a ball-nut arrangement provides a high level of precision when driving the linear threaded plunger, as opposed to geared motors. This allows a wiser consumption of electricity and power, making the entire brake system more efficient.

According to another aspect of the subject matter of the present application there is provided an air vehicle, for example an aircraft, comprising at least one wheel having a wheel disc, and having assembled thereto an add-on brake system according to the previous aspect of the present application, receiving said wheel disc between the inboard and outboard brakes pads thereof.

In operation, in the first, loose position, neither of the brake pads are in contact with the wheel disc. In this position, the housing is disposed at a distance $M_1$ from the wheel disc.

The add-on brake system is slidingly mounted onto the wheel of the air vehicle, and configured for performing a displacement in the linear direction during its operation. Specifically, from the above initial unclamped position (also referred to herein as the loose position), revolution of the nut causes linear displacement of the plunger, so that the second end thereof associated with the outboard brake pad displaces the latter towards the wheel disc.

The outboard brake pad displaces linearly towards the wheel disc until it engages it, thereby bringing the add-on brake system into an intermediate brake position (also referred to herein as a first clamped position). In this position, the outboard brake pad is flush against an external surface of the wheel disc, the inboard brake pad is still spaced from an internal surface of the wheel disc, and the housing is still at a distance $M_1$ from the when disc.

From the intermediate brake position, further revolution of the nut arrangement entails further linear displacement of the linear threaded plunger. However, since the outboard brake pad is restricted from further linear movement (abutting the external surface of the wheel disc), this resulting effect causes the entire housing, along with the nut arrangement and the inboard brake pad, to linearly displace in the opposite direction, bringing the inboard brake pad closer to the internal surface of the wheel disc.

Upon abutment of the inboard brake pad with the internal surface of the wheel disc, the add-on brake system reaches its second clamped position (also referred to herein as the final clamped position). In this position, the wheel disc is firmly clamped between the inboard and outboard brake pads, and the housing is disposed at a distance $M_2 > M_1$ from the wheel disc.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1A:
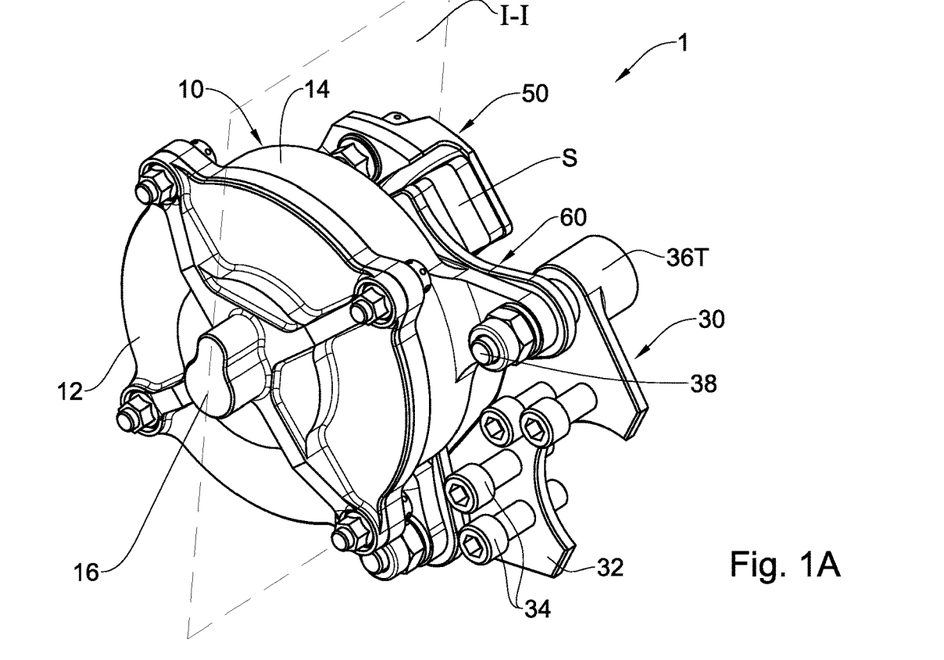
FIGS. 1A and 1B are schematic front and rear perspective views of a brake system of the present application, respectively.
Figure 1B:
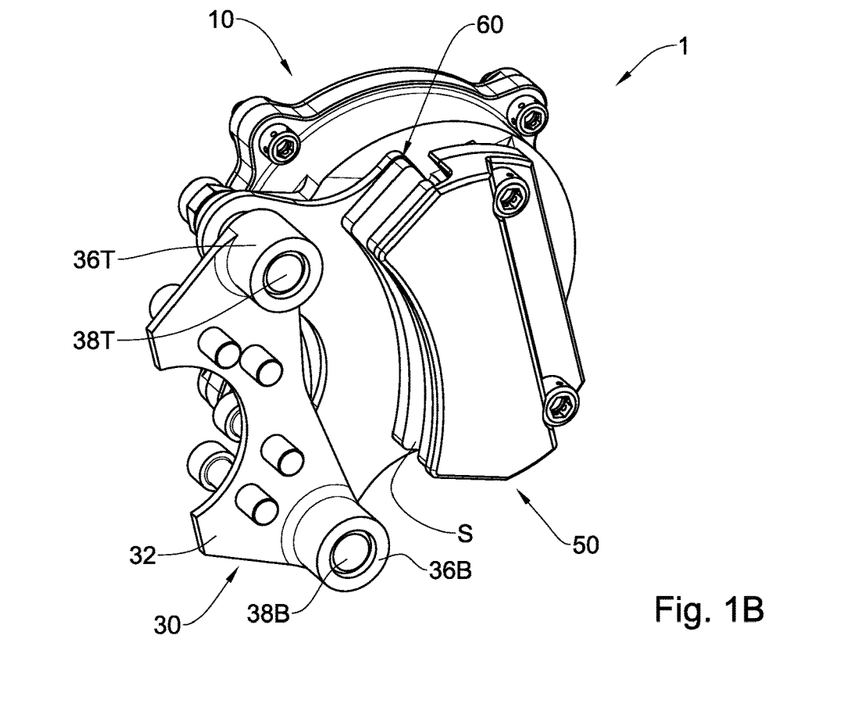

Attention is first drawn to FIGS. 1A and 1B, in which an add-on brake system is shown, generally designated with reference numeral 1, and comprising a housing 10, a mounting arrangement 30, an inboard brake pad assembly 50, and an outboard brake pad assembly 60. The add-on brake system is configured for being fixedly mounted onto a wheel of an air vehicles, for example an aircraft (see FIGS. 3A to 3C), and has a spacing S between the brake pad assemblies 50, 60 configured for receiving therein a disc element of the wheel.

Figure 2:
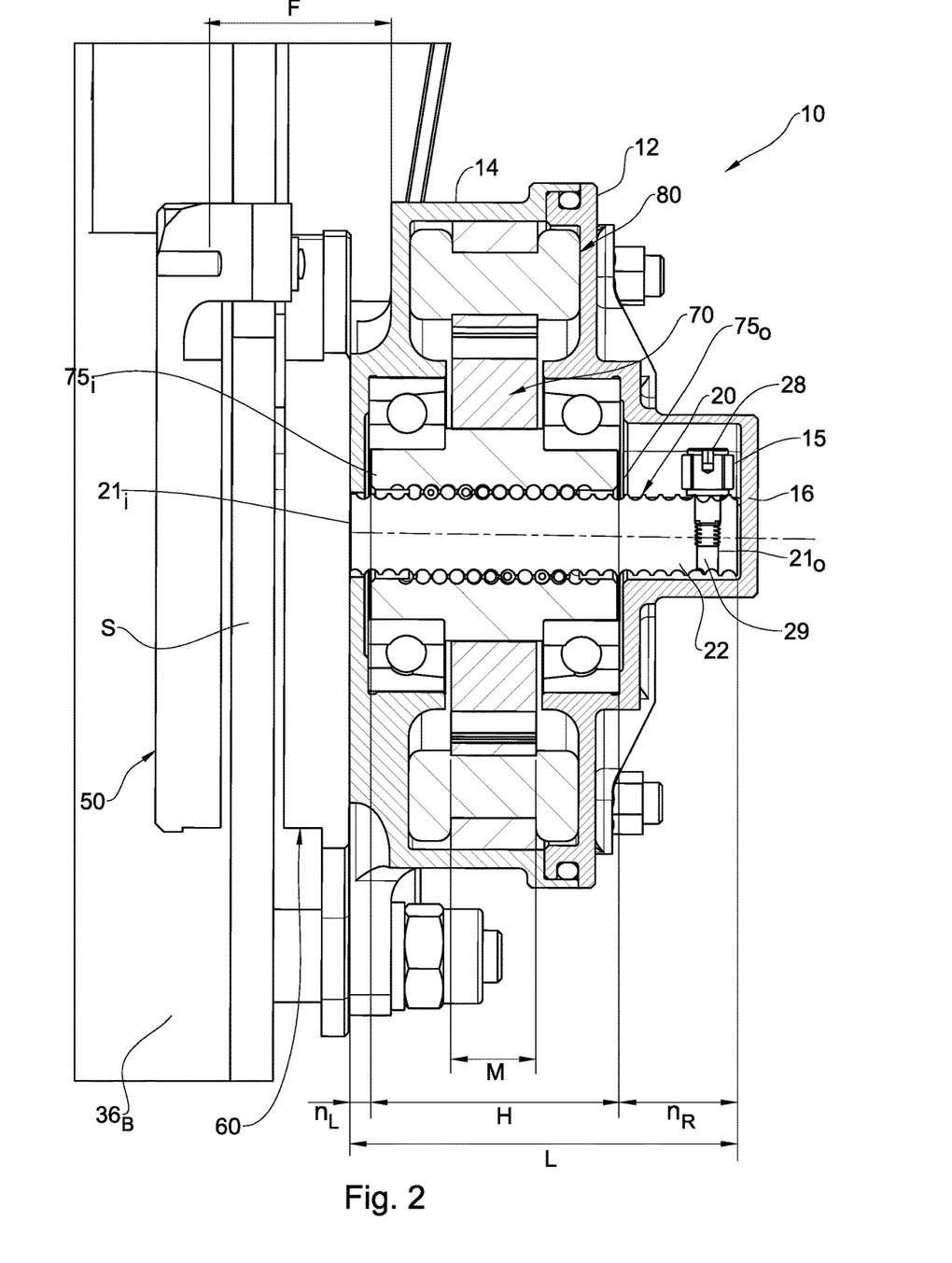
FIG. 2 is a schematic cross-section view of the brake system shown in FIGS. 1A and 1B, taken along a plane I-I shown in FIG. 1A.

Turning now to FIG. 2, the housing 10 is shown accommodating a linear actuator assembly in the form of a brushless motor comprising a stator 80, a rotor 70 associated with the stator 80 and configured for being revolved thereby, a nut arrangement 73 (shown FIG. 4B) fixedly associated with the rotor 70 and a linear threaded plunger 20 engaged with the nut arrangement to be linearly driven thereby. The rotor 70 is supported on both sides by bearings 90.

It is also observed that the motor has a width M in cross-section and the nut housing has a width H, symmetrically aligned. However, the plunger 20 protrudes to an extent $n_L$ on an inner end $21_I$ thereof from the left end of the nut housing, and to an extent $n_R$ on an outer end $21_O$ thereof from the right end of the nut housing.

Figure 4A:
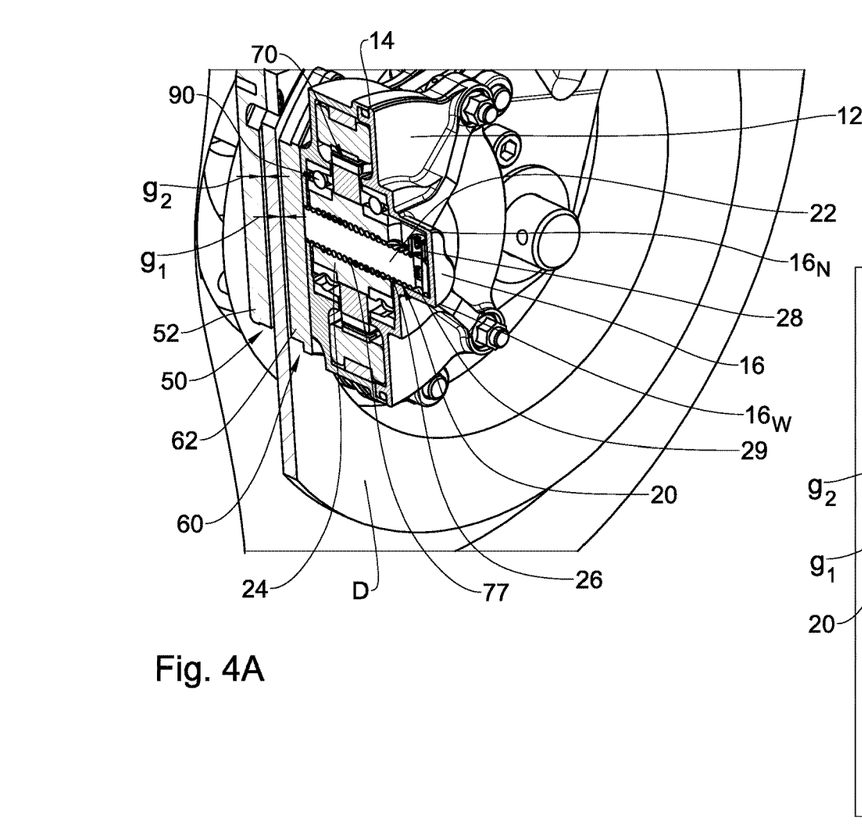
FIG. 4A is a schematic cross-section view of the brake system taken along a plane II-II shown in FIG. 3C.
Figure 4B:
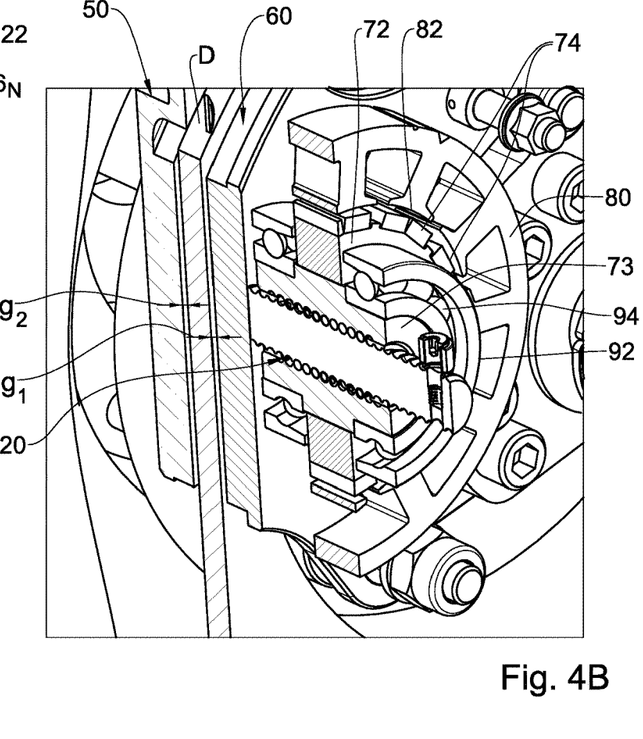
FIG. 4B is a schematic cross-section view of the brake system shown in FIG. 4A, with some of the components being stripped to expose its electric motor.

With additional reference being made also to FIGS. 4A and 4B, the stator 80 is 30 fixedly contained within the housing and comprises a plurality of electromagnet ends 82. In operation, when alternating electrical current is passed through the stator 80, it entails revolution of the rotor 70, owing to the magnetic relationship between the electromagnets 82 of the stator 80 and the permanent magnets 74 of the rotor 70. Since the rotor body 72 is integrally formed or otherwise fixed with the nut housing 73, they revolve together under the magnetic force of the stator 80.

The rotor 70 is supported by two ball bearings 90 allowing it to freely rotate about its axis X, and the nut arrangement 73 is formed with at least a portion of a ball path 77 accommodating therein a plurality of balls 26, which form the interface between the nut arrangement 73 and the plunger 22. The ball path can be, for example, in a form of a helix about axis X.

In addition, the outer end $21_O$ of the plunger 22 is formed with a transverse bore 29 fixedly receiving therein a restricting member 28. The head portion of the restricting member 28 is retained within a narrow portion $16_N$ of the housing 10, preventing the restricting member 28, and thereby the entire plunger 22, from revolving about the central axis X. The plunger 22 is also formed with at least another portion of a ball path 77.

Figures 3A, 3B, 3C:
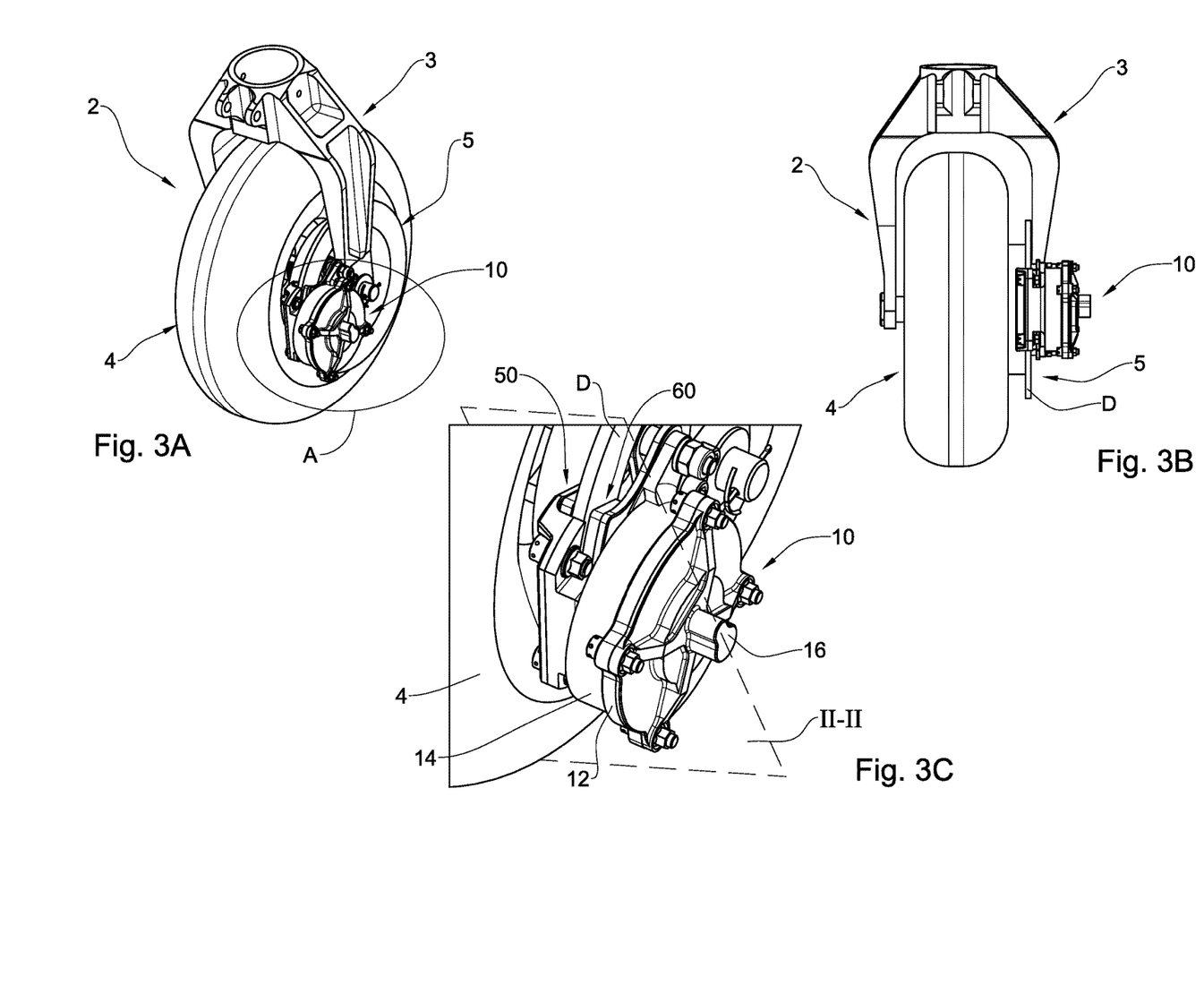
FIG. 3A is a schematic isometric view of a wheel of an air vehicle, for example an aircraft, having assembled thereon the brake system shown in FIGS. 1A to 2.
FIG. 3B is a schematic front view of the wheel shown in FIG. 3A.
FIG. 3C is a schematic enlarged view of detail A shown in FIG. 3A.

Attention is now drawn to FIGS. 3A to 3C, in which the add-on brake system 1 is shown mounted onto a wheel assembly 2 of an air vehicles, for example an aircraft (not shown). The wheel assembly 2 comprises a fork 3 articulated to a wheel 4, i.e., the wheel 4 is rotatably mounted to the fork 2. The wheel 4 is provided with a wheel insert 5 comprising a wheel disc D, fixedly mounted to the wheel 4 in a manner such that relative rotation between the insert 5 and the wheel 4 is prevented.

The add-on brake system 1 is mounted onto the wheel assembly 2 so that a peripheral portion of the wheel disc D is received between the inboard and outboard brake pads 50, 60 respectively. The add-on brake system 1 is slidingly mounted via the mounting arrangement 30, and allows the entire add-on brake system 1 to displace linearly during operation, as will now be explained, with reference to FIGS. 5A to 6C.

Figures 5A, 5B, 5C:
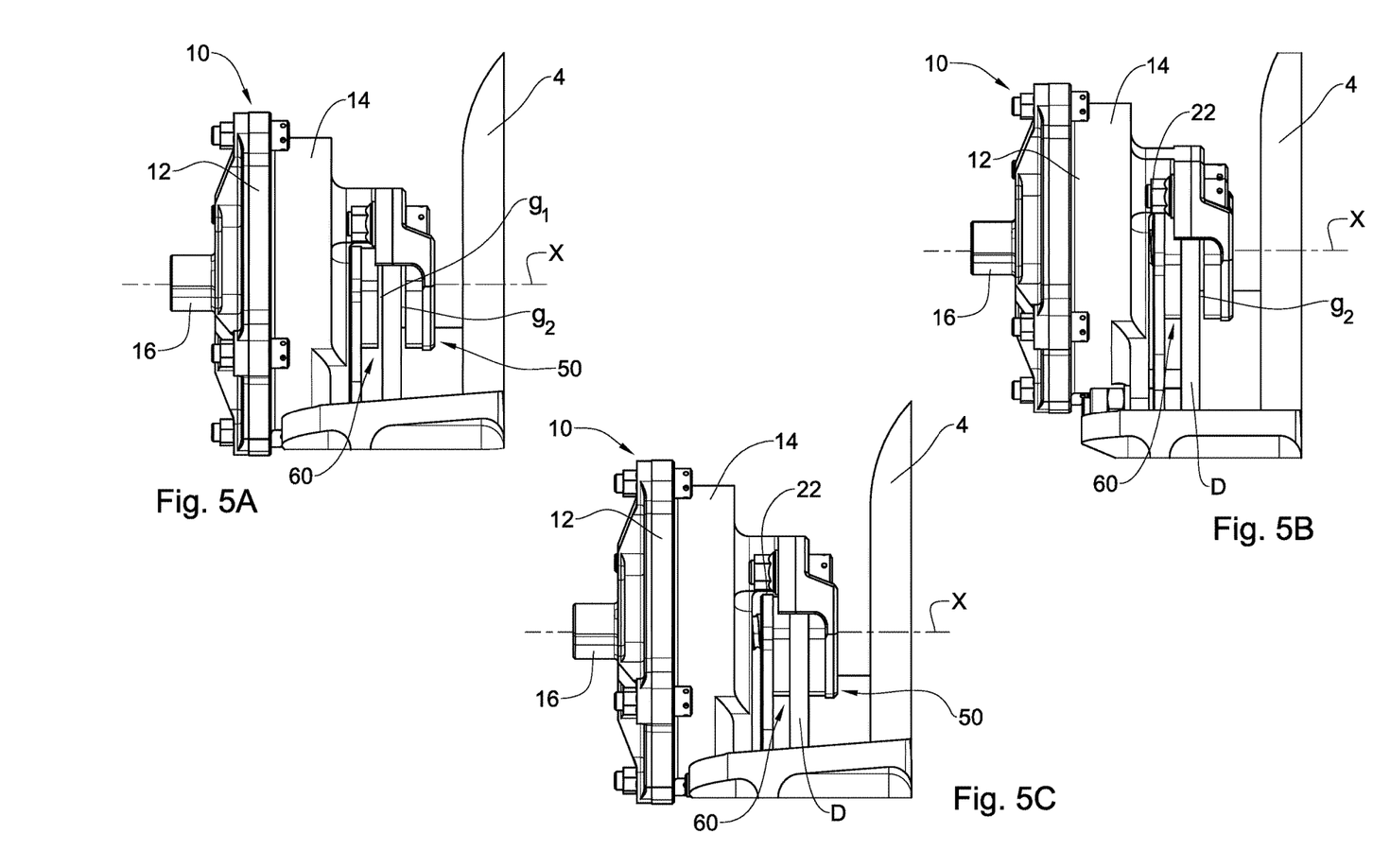
FIGS. 5A to 5C are schematic top views of consecutive stages of operation of the brake system shown in FIGS. 1A to 4B.
Figure 6A:
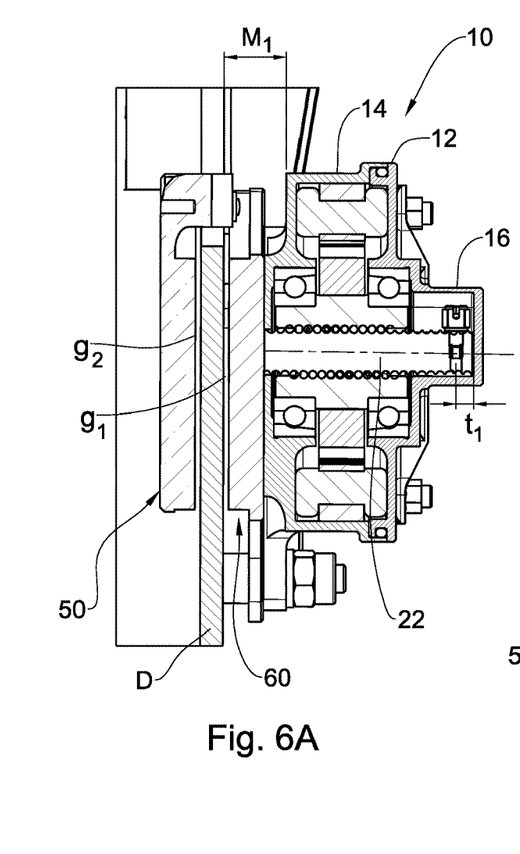
FIGS. 6A to 6C are respective schematic cross-section views of the brake system in the positions shown in FIGS. 5A to 5C, taken along the plane II-II shown in FIG. 3C.

As shown in FIGS. 5A and 6A, in the initial unclamped position (also referred to herein as the loose position) of the brake system 1, both inboard and outboard brake pads 50, 60 respectively, are spaced from the wheel disc D, having respective gaps $g_1$, $g_2$ therefrom. In this position, the housing is disposed at a distance $M_1$ from the external surface of the wheel disc D.

Upon actuation of the motor and electrical current passing through the stator 80, the rotor 70 is caused to revolve about its own axis X, thereby revolving therewith the nut arrangement 73. This revolution attempts to rotate the plunger 22 owing to the threaded engagement between the plunger 22 and the balls 26.

Figure 6B:
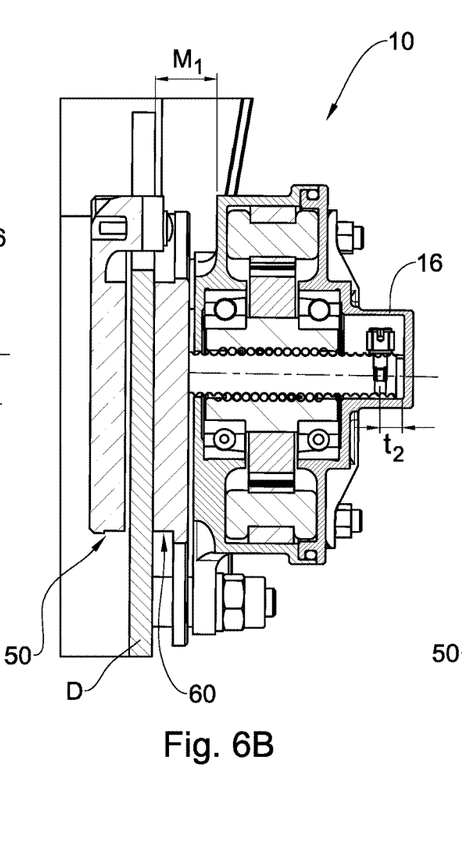

However, since the plunger 22 is restricted from revolving, by the restricting member 28, such revolution of the nut arrangement 73 causes linear displacement of the plunger 22, bringing the outboard brake pad 60 closer to the external surface of the wheel disc, until it reaches the position shown in FIGS. 5B, 6B.

This first clamped position (also referred to herein as the intermediate clamped position) is achieved once the outboard brake pad abuts the external surface of the wheel disc D and is arrested thereby. In this intermediate position, the gap $g_1$ is closed (=0), yet the gap $g_2$ is still present. It is also noted that in this displacement, the outboard brake pad 60 moves with respect to the inboard brake pad 50 and the housing 10 (moving away from the housing 10 and closer to the inboard brake pad 50).

Figure 6C:
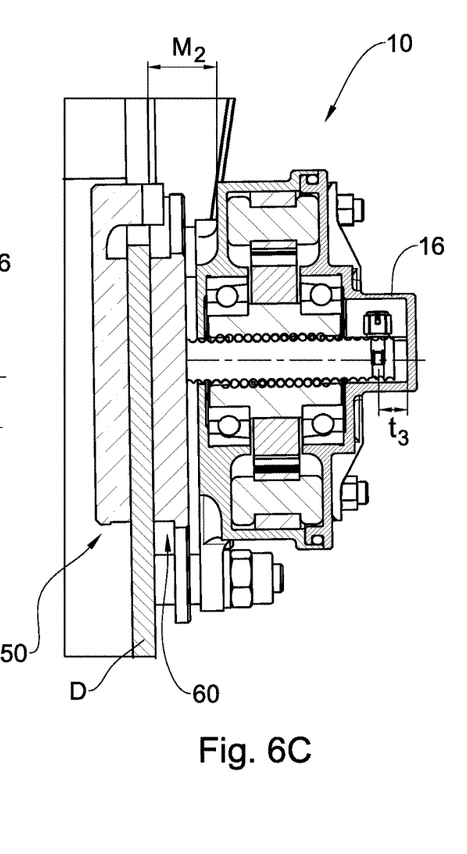

From this first clamped position, further revolution of the nut arrangement 73 attempts pushing the plunger 2, and subsequently the outboard brake pad 60, against the external surface of the wheel disc D. However, since the wheel disc D is fixedly attached to the wheel 2, on which the add-on brake system 1 is mounted, such further advancement of the plunger 22 with respect to the nut arrangement 73 causes a linear sliding displacement of the entire housing 10, along with the inboard brake pad 50, in the opposite direction. Thus, this displacement of the housing results in the inboard brake pad 50 moving towards the internal surface of the wheel disc D, while the housing moves away from the external wheel disc D.

This operation progresses until the inboard brake pad 50 abuts the internal surface of the wheel disc D, thereby arresting the inboard brake pad, bringing the add-on brake system 1 to its second clamped position. In this position, the wheel disc D is tightly clamped between the brake pads 50, 60, allowing the brake system 1 to halt an air vehicle, for example an aircraft.

It is noted that during both the initial unclamped position and the first clamped position, the distance of the housing 10 from the wheel disc D remains constant ($M_1$). It is only during the final stages of operation, in moving from the first clamped position to the second clamped position (also referred to herein as the final clamped position), that this distance changes to $M_2 < M_1$.

It is observed that throughout the operation of the add-on brake system 1, the plunger 20 only slightly displaces axially, so that it never protrudes from the housing of the nut arrangement to an extent greater than a given ratio. In particular, the arrangement is such that the L/H<1.5, and each of the extends $n_L$, $n_R$ are smaller than H/4, providing a compact arrangement of the motor.

Those skilled in the art to which this presently disclosed subject matter pertains will readily appreciate that numerous changes, variations, and modifications can be made without departing from the scope of the presently disclosed subject matter, mutatis mutandis.

The invention claimed is:

1. An add-on brake system configured for clamping a wheel disc of a vehicle, the add-on brake system comprising:
   a housing accommodating a direct-drive linear actuator comprising:
   an electric motor comprising a rotor and a stator
   a nut arrangement fixedly and directly coupled to the rotor and configured for revolving therewith;
   a linear threaded plunger associated with the nut arrangement for being driven thereby in a linear direction upon the revolution of the latter, said plunger having a first end linearly protruding from one end of the nut arrangement and a second end linearly protruding from an opposite end of the nut arrangement;
   at least one inboard brake pad fixedly coupled to the housing;
   at least one outboard brake pad associated with the second end of the linear threaded plunger, oriented transverse to the linear threaded plunger and configured for being driven thereby in the linear direction;
   said linear threaded plunger being configured for assuming an initial unclamped position in which the second end protrudes to a first extent $n_1$ from the other end of the nut arrangement, yielding a first spacing $S_1$ between the inboard and outboard brake pads, and a final clamped position in which the second end protrudes to a second extent $n_2 > n_1$ from the other end of the nut arrangement, yielding a second spacing $S_2 < S_1$ between the inboard and outboard brake pads, allowing clamping the wheel disc;
   wherein the linear threaded plunger comprises a restricting member, configured for preventing the plunger from rotating about its axis, whereby revolution of the nut arrangement about the plunger restricts the displacement of the plunger only to the linear direction, wherein the restricting member is associated with the housing in a manner preventing revolution of the plunger, wherein the restricting member is a pin having a first end associated with the plunger and a second end received within a channel formed in the housing and preventing revolution of the pin, and wherein the channel extends in the longitudinal direction, wherein, when said plunger displaces in the linear direction, the pin travels together with the plunger, the second end sliding within the channel of the housing.

2. The add-on brake system according to claim 1, wherein the electric motor is a brushless type motor.

3. The add-on brake system according to claim 1, wherein the distance between the housing and the inboard brake pad remains constant throughout the operation of the add-on brake system.

4. The add-on brake system according to claim 1, wherein the nut arrangement has a maximal linear extension H between the first end and second end thereof, and said linear threaded plunger has a maximal linear extension L between its respective ends, so that L/H<1.5.

5. The add-on brake system according to claim 4, wherein n1, n2<H/4.

6. The add-on brake system according to claim 1, wherein the nut arrangement is a ball-nut type.

7. The add-on brake system according to claim 1, wherein the brake system is configured for operating in conjunction with small-scale air vehicles.

8. The add-on brake system according to claim 1, wherein the an add-on brake system has a power consumption ranging between about 50 Watt and about 70 Watt.

9. The add-on brake system according to claim 1, wherein said brake system is configured for constituting one of an array of add-on brake systems, mounted on the same wheel disc of an air vehicle, at different locations thereof.

10. An air vehicle comprising at least one wheel having a wheel disc, and having assembled thereto an add-on brake system as defined according to claim 1.

11. The air vehicle according to claim 10, wherein the add-on brake system is slidingly mounted onto the wheel of the air vehicle, and configured for performing a displacement in the linear direction during its operation.

12. The air vehicle according to claim 10, wherein, in operation, in the initial unclamped position of the brake system, neither one of the at least one inboard brake pad and the at least one outboard brake pad is in contact with the wheel disc, and wherein the housing is disposed at a distance M1 from the wheel disc.

13. The air vehicle according to claim 12, wherein, from the initial unclamped position, revolution of the nut is configured to entail linear displacement of the plunger, so that the second end thereof associated with the outboard brake pad is urged to displace the latter towards the wheel disc.

14. The air vehicle according to claim 13, wherein, the outboard brake pad is configured to displace linearly towards the wheel disc until it engages it, thereby bringing the add-on brake system into an intermediate brake position.

15. The air vehicle according to claim 14, wherein, when the outboard brake pad is flush against an external surface of the wheel disc, the inboard brake pad is still spaced from an internal surface of the wheel disc, and the housing is still at a distance M1 from the when disc.

16. The air vehicle according to claim 15, wherein further revolution of the nut arrangement entails further linear displacement of the linear plunger, resulting in the entire housing linearly displacing, along with the nut arrangement and the inboard brake pad, bringing the inboard brake pad closer to the internal surface of the wheel disc.

17. The air vehicle according to claim 16, wherein, upon abutment of the inboard brake pad with the internal surface of the wheel disc, the add-on brake system reaches its final clamped position.

18. The air vehicle according to claim 16, wherein, in the final clamped position, the wheel disc is firmly clamped between the inboard brake pad and the outboard brake pad, and the housing is disposed at a distance M2>M1 from the wheel disc.

* * * * *